A. L. McGREGOR.
AUTOMOBILE BUMPER.
APPLICATION FILED MAR. 24, 1920.
1,359,186.
Patented Nov. 16, 1920.
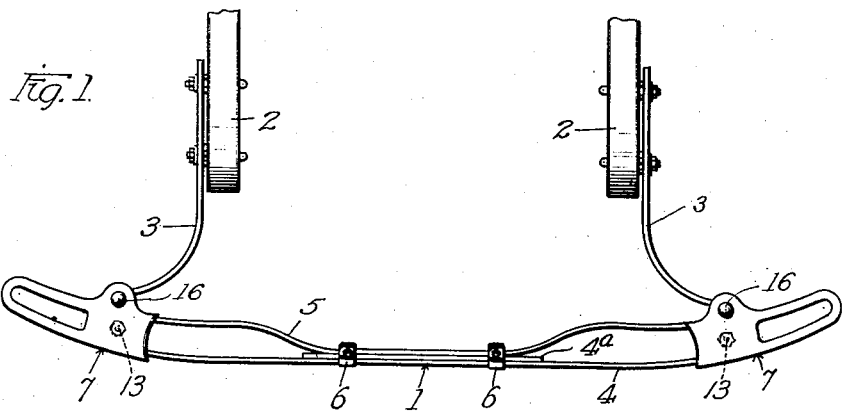
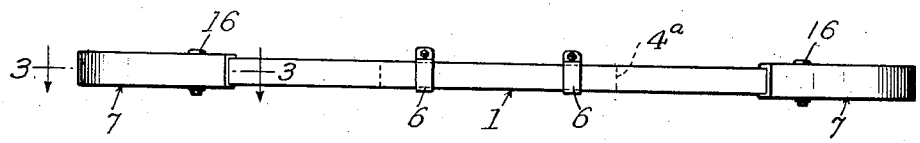
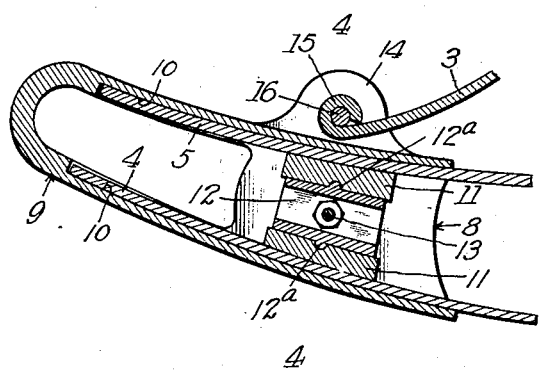
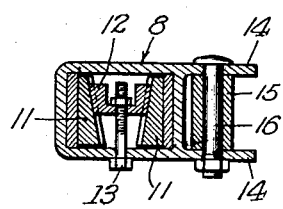
Inventor
Allan L. McGregor
Offield, Poole & Hinton
Attys.

UNITED STATES PATENT OFFICE.

ALLAN L. McGREGOR, OF CHICAGO, ILLINOIS.

AUTOMOBILE-BUMPER.

1,359,186.     Specification of Letters Patent.     Patented Nov. 16, 1920.

Application filed March 24, 1920. Serial No. 368,469.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers and more particularly to those devices adapted to be attached to the frame of a motor vehicle for the purpose of protecting the same from damage by collision with other vehicles and obstacles.

The object of the present invention is to provide a construction for a device of the character described, including certain novel features calculated to facilitate the attachment of the bumper to different makes of vehicles and to provide a simpler and stronger construction without sacrificing the pleasing or otherwise finished appearance of the device.

The features of my invention pertain more particularly to the construction and arrangement of sleeves or terminal members designed to be adjustably secured to the ends of the bumper impact member, these members in turn being connected with intermediate members attached directly to the vehicle frame. The invention is hereinafter more fully described and illustrated in connection with the accompanying drawings, in which—

Figure 1 is a top plan view of a bumper embodying the features of the invention, and shown as attached to a vehicle frame, Fig. 2 is a front view in elevation of the impact member of the bumper, Fig. 3 is an enlarged detail view in horizontal section of one of the terminal sleeves, as taken on line 3, 3 of Fig. 2, and Fig. 4 is a detail view in cross-section, taken on line 4, 4 of Fig. 3.

A preferred bumper structure embodying the features of the invention comprises in general an impact member 1 adapted to be supported beyond the longitudinal frame members 2, 2 of a vehicle by means of forwardly projecting members or bars 3, 3 connected to the impact member 1 at points immediately adjacent to its extremities. A preferable construction of the impact member comprises a forward impact bar 4 extending substantially throughout the length of the impact member and slightly curved in a rearward direction to provide the desired curvature throughout its end portions, and a rearwardly disposed bar 5, spaced horizontally from the bar 4 throughout the end portions of the impact member although brought into close contact with the forward impact bar 4 throughout said central portion and rigidly connected thereto and to an intermediate short bar 4ª by means of straps 6, 6 surrounding said bars. The remaining portions of the bar 5 are spaced rearwardly from the forward impact bar 4 and terminate at their free ends in substantially parallel relation thereto.

Fitting over the end portions of the bars 4 and 5 are cast metal terminal members 7, 7, having the form of sleeves, which may be more accurately described in the following manner: Each of the terminal members or sleeves comprises a box-like portion 8 of rectangular contour, which is open at its ends, said box-like portion 8 being extended at one end thereof in the form of an integral U-shaped portion 9 which constitutes in effect the continuation of the vertical side walls of the portion 8, which unite in a rounded extremity. The side walls together with the parallel portions of the U-shaped end portion of the terminal members converge slightly toward the rounded extremity thereof, there being provided or formed in the inner vertical surfaces thereof shallow grooves terminating a short distance from the rounded or closed extremity of the terminal member. As clearly shown in Fig. 3, the terminal member is slipped over the ends of the bars 4 and 5 so that the same are inclosed within the box-like portion 8 and extend outwardly toward the rounded extremity and lie within the channels 10, 10.

Within the portion 8 and located between the vertical walls thereof are mounted tapered blocks 11, 11 which bear flatwise against the bars 4 and 5, which in turn engage the vertical walls of the surrounding portion 8. These blocks are spaced apart with their tapered or inclined surfaces facing each other. Between the blocks 11, 11 is mounted a movable wedge block 12 having lateral bearing surfaces with the same degree of inclination as the inclined surfaces of the blocks 11, 11. In order to prevent the displacement of the wedge block, the same is provided with transverse ribs 12ª, 12ª which engage corresponding grooves in the blocks 11, 11. A bolt 13 passing through one of the horizontal walls of the sleeve portion 8 has screw threaded engagement with the wedge block 12 so that by rotating the bolt by means of the externally located head, the blocks 11, 11 may be spread apart thereby tightly clamping the bars 4 and 5 between said blocks and the adjacent walls of the sleeve 8, and similarly loosen the blocks 11, 11 in order to disengage the bars 4 and 5 from the sleeve. By reason of this arrangement of wedge blocks or expansible clamping members, the terminal sleeves may be moved endwise relative to the bars 4 and 5 thereby varying the length of the impact member.

Integral with the end sleeves 7, 7 are two transversely projecting ears 14, 14 located on the rearmost side thereof and adjacent to the inner end. These ears are spaced apart vertically and include between them the outer or free end of the connecting bars 3, 3 which are directly connected at their opposite ends to the frame members 2, 2. At the extremity of each bar 3 is provided an eye 15 which is engaged by a bolt 16 extending vertically through the ears 14, 14.

From the description it is manifest that the end sleeves 7, 7 form the extremities of the impact bar as well as the means for connecting and supporting the same to the vehicle and through the medium of the connecting bars 3, 3. By reason of their construction, the ends of the bars 4 and 5 are completely inclosed and concealed thereby, thus carrying out the appearance of continuous bars extending throughout the total length of the impact member even to the extent of forming the U-shaped extremities. By the provision of the expansible clamping member, the length of the impact member may be adjusted so that the points of connection between the terminal sleeves and the connecting bars 3, 3 may be adjusted laterally in order that the bumper may be attached to various makes of vehicles differing as to the distance separating the frame members 2, 2. Furthermore, the clamping members are entirely inclosed within the surrounding walls of the terminal sleeves and therefore are not unsightly in appearance.

The details of construction embodied in my invention may manifestly be modified without departing from the spirit of the invention, and therefore I do not wish to be limited except in so far as the invention is specifically set forth in the appended claims.

I claim as my invention:

1. In an automobile bumper, the combination of an impact member comprising a bar, a sleeve adjustable endwise along the free end of said bar and forming the extremity of the impact member, and means for clamping said bar and sleeve together in several positions of adjustment.

2. In an automobile bumper, the combination of an impact member comprising bars spaced apart at their free ends, a sleeve adapted to receive the adjacent end portions of said bars, and having a U-shaped end portion forming the extremity of the impact member, and means for adjustably clamping the bars against said sleeve.

3. In an automobile bumper, the combination of an impact member, comprising bars spaced apart at their ends, a cast metal member adjustably mounted at the ends of said bars and connected with the vehicle frame, said member forming the extremities of the impact member.

4. In an automobile bumper, the combination of an impact member comprising bars spaced apart at their free ends, a sleeve adapted for connection to a vehicle frame and embracing the free end of said bars, and comprising a U-shaped portion extending beyond said free end to form the extremity of the impact member, and means for adjustably connecting said sleeve lengthwise of said bars.

5. In an automobile bumper, the combination of an impact member comprising bars terminating in spaced relation at their free ends, a sleeve surrounding the free end portions of said bars and provided with an integral U-shaped portion forming a continuation of the bars, and an expansible clamping member for adjustably connecting said sleeve and bars.

6. In an automobile bumper, the combination of an impact member, comprising bars spaced apart at their free ends, a sleeve adapted to engage the free end portions of said bars, and having a U-shaped end portion forming the extremity of the impact member and provided with channels for receiving said end portions of the bars, and means for adjustably clamping the bars against said sleeve.

7. In an automobile bumper, the combination of an impact member comprising bars terminating in spaced relation at the ends of the impact member, a sleeve surrounding said end portions of said bar and provided with an integral U-shaped portion forming the extremities of the impact member of the bars, and an expansible clamping member for adjustably connecting said sleeve and bars.

8. In an automobile bumper, the combination of an impact member comprising bars spaced apart horizontally at their free end portions, a sleeve fitting over the ends of said bars and comprising an integral U-shaped portion forming the extremity of the impact member, and an expansible wedge block mounted between said bars for clamping said sleeve in several positions of longitudinal adjustment along said bars.

In witness whereof I hereunto subscribe my name this 20th day of March, A. D. 1920.

ALLAN L. McGREGOR.